Jan. 4, 1966  J. A. DRAXLER  3,227,299
MECHANICAL AND VACUUM OPERATED ROLL HANDLING APPARATUS
Filed Feb. 20, 1963  4 Sheets-Sheet 1

INVENTOR.
JOHN A. DRAXLER
BY
ATTORNEY

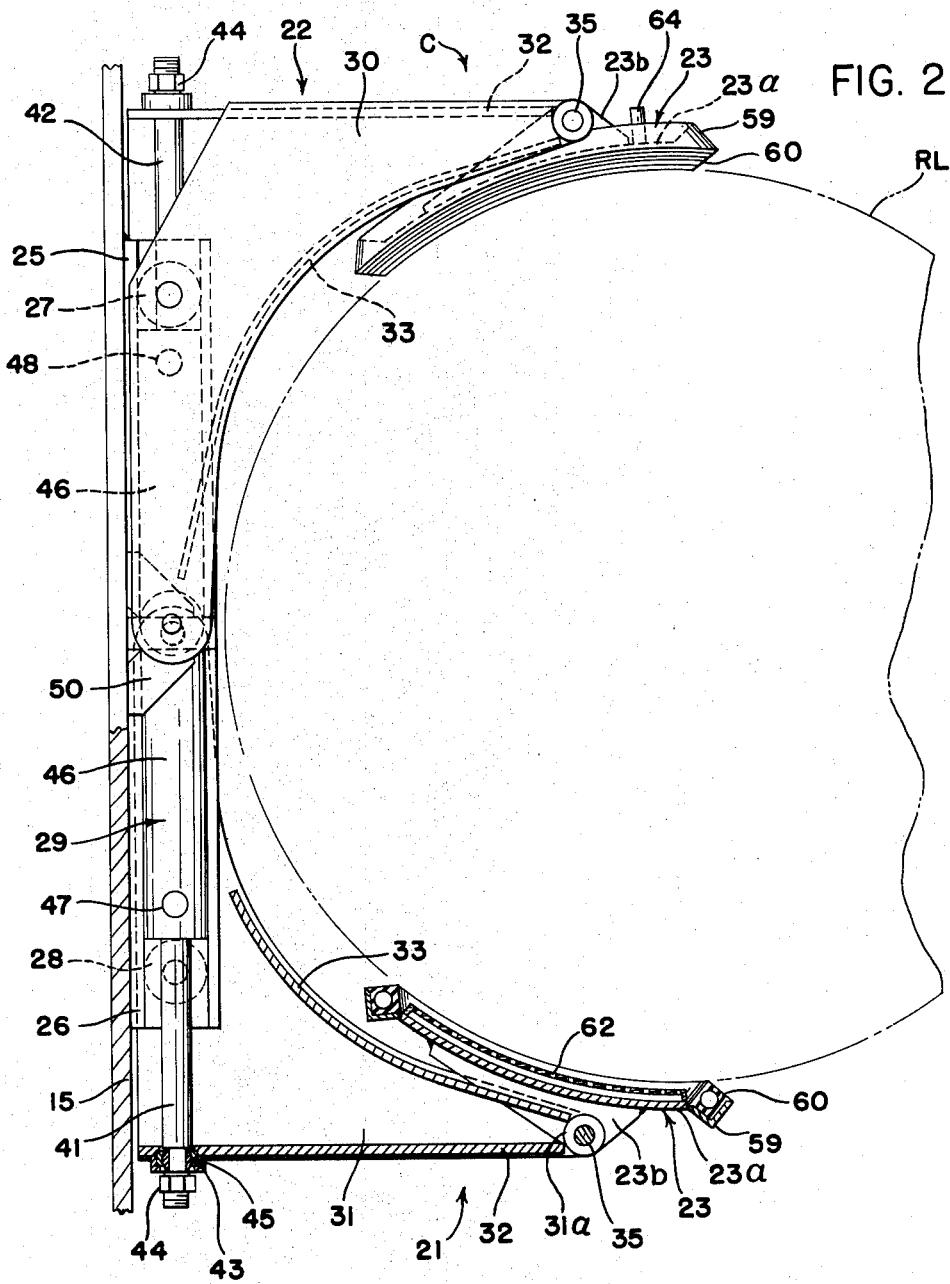

Jan. 4, 1966   J. A. DRAXLER   3,227,299
MECHANICAL AND VACUUM OPERATED ROLL HANDLING APPARATUS
Filed Feb. 20, 1963   4 Sheets-Sheet 3
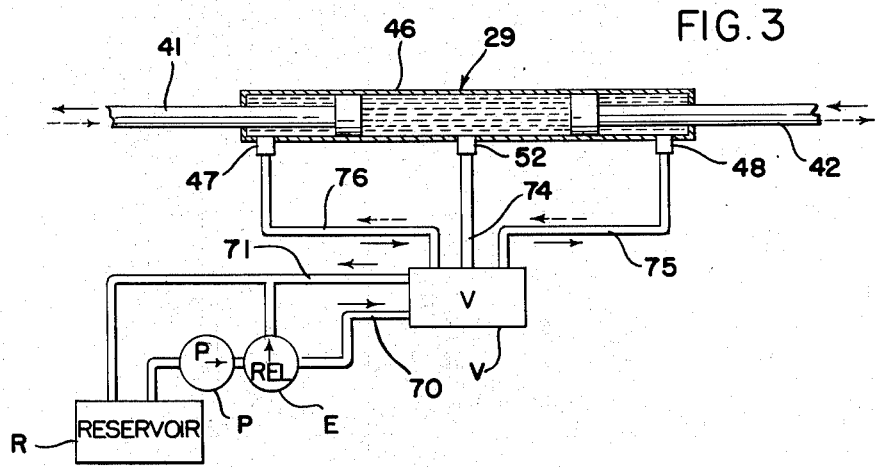
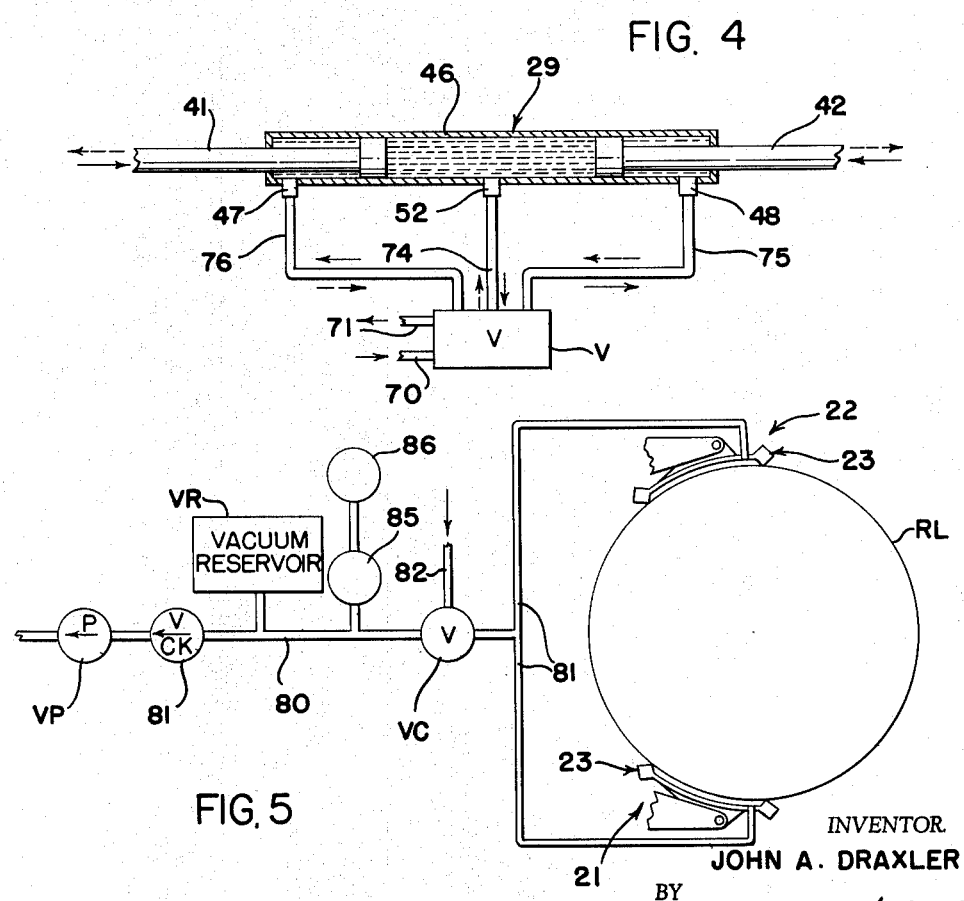
INVENTOR.
JOHN A. DRAXLER
BY
*Philip D. Gohrick*
ATTORNEY Jan. 4, 1966  J. A. DRAXLER  3,227,299
MECHANICAL AND VACUUM OPERATED ROLL HANDLING APPARATUS
Filed Feb. 20, 1963  4 Sheets-Sheet 4
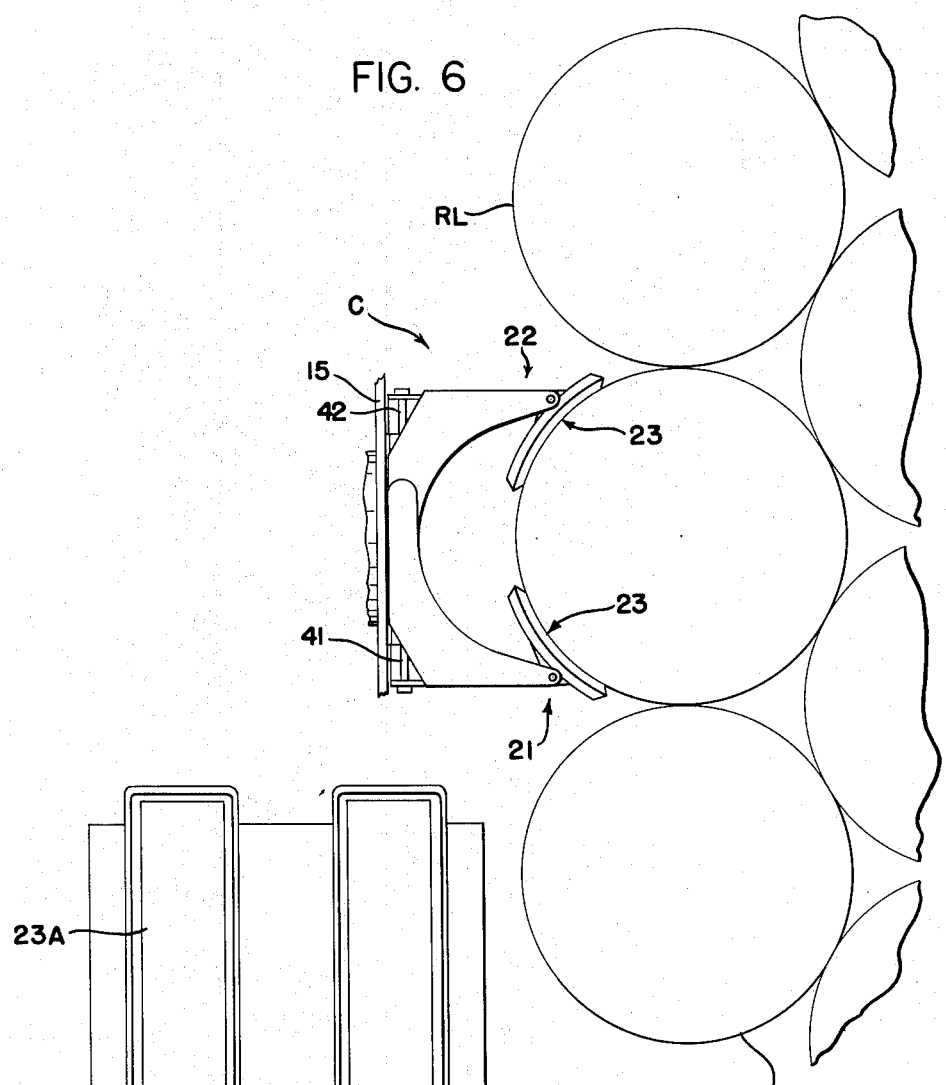
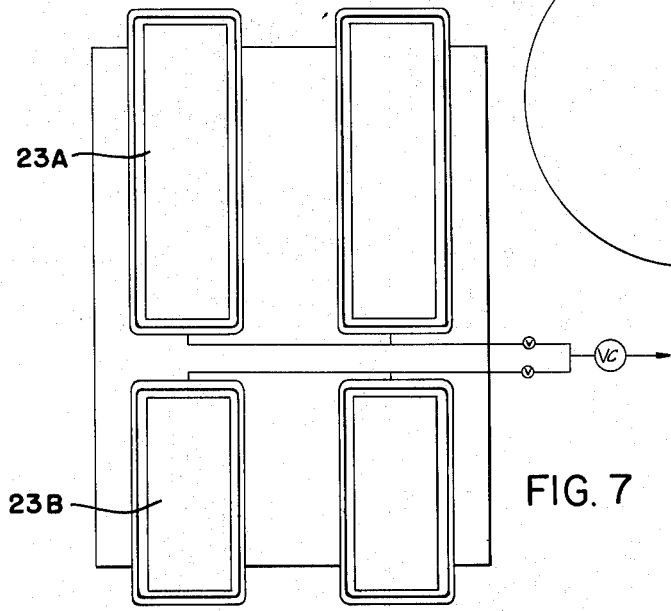
INVENTOR.
JOHN A. DRAXLER
BY *Philip D. Golrick*
ATTORNEY United States Patent Office 3,227,299
Patented Jan. 4, 1966

3,227,299
MECHANICAL AND VACUUM OPERATED
ROLL HANDLING APPARATUS
John A. Draxler, Berea, Ohio, assignor to The Elwell-Parker Electric Company, Cleveland, Ohio, a corporation of Ohio
Filed Feb. 20, 1963, Ser. No. 259,990
8 Claims. (Cl. 214—653)

The present invention is concerned generally with an apparatus for handling of cylindrical loads, and more particularly with an apparatus including a vacuum-type gripping device. The invention is hereafter described as embodied in a vacuum-gripping and mechanical clamping apparatus in an industrial truck environment which is particularly adaptable for use in handling of cylindrical loads such as rolls or coils of sheet or strip material.

A rather wide variety of load engaging devices is well known to the prior art utilizing vacuum-gripping means for supporting or manipulating a load, and so also of devices relying upon a mechanical application of a gripping force through a plurality of relatively movable clamping jaw members in opposed or other cooperating disposition.

In prior devices of the mechanical clamping type, certain limitations have been inherent, among others for example, being the ease with which a cylindrical roll may be manipulated in placing or withdrawing one roll in a series or row of closely packed rolls. In this situation the very dimensions of the jaws or gripping elements prevent insertion of the jaws into the series to embrace substantially diametrically a single roll or even to effect such more limited engagement with a single roll that the roll is readily and reliably removable—if at all—without extraneous operations to develop the needed space. Also for a given clamp certain rolls could not be engaged and moved or at least not safely moved, because the roll could not be sufficiently embraced to obtain a sure engagement without tendency of the roll to pop out or to be squeezed out from between opposed jaws.

In the latter case as the points of engagement with the roll move away from a near diametric disposition, components of applied force arise tending to expel a roll from between the jaws causing loss of the load when frictional forces of contact are overcome thereby.

It is an object of the present invention to overcome these problems and limitations by including, in combination with means providing mechanical clamping action, vacuum-gripping means which permit adequate engagement and gripping whereby a roll may be "fished" out or moved out of a series of closely packed rolls by a vacuum application acting either alone or in combination with mechanical and frictional clamping forces and thereafter immediately transported safely, or reengaged at more favorable locations, accessible when the roll is removed from a close series, for transport in a safe and secure manner. Also by the combination of vacuum and mechanical gripping action for a given size gripping or clamping apparatus, it is an object of the present invention to provide a capacity for handling larger diameter rolls by an engagement which would not ordinarily be sufficient with merely mechanical gripping.

It has further been found that in a vacuum-gripping device for a load in effect lamellar, as for example results from winding paper into a roll, it may at times happen that the load may break loose because of tearing of the external layer or layers through the support effectively applied to the load; the strength of such layers being insufficient to support the entire load weight. By the advantageous inclusion of mechanical clamping action as well this tendency is minimized. Furthermore, with certain materials which are relatively impermeable to air, for example, certain types of heavily sized or glazed papers, plastic films, or even the packaging binder external sheet often used with various and diverse roll loads, the vacuum gripping force is effectively applied solely to the single external layer, which then in effect is supporting the entire mass of the load with consequent dangers of similar breakage and load loss. The present invention under the aspects of combining both the mechanical clamping and vacuum-gripping means has the advantage of overcoming this difficulty in great part or permitting the handling of loads of greater weight than would otherwise be possible.

Further the inclusion of vacuum-gripping means as hereinafter described, adapted to engage a cylindrical surface as the load handling means on an industrial truck wherein the mounting of the gripping means to the truck comprises conventional tier-lift mast structure, mast tilting structure, and load gripper rotating means, permits in a material handling operation using such trucks a much more economic manipulation and stowing of goods in roll form both for storage, and in vehicles for transport to and from the system.

By a further elaboration of one aspect of the inventive concept, in a single apparatus there is provided additional advantageous capability of handling a considerable variety of roll lengths.

Moreover for compact arrangement of the overall mechanism in its mounting to the truck, and its flexibility of operation, there is advantageously included in the jaw actuating system of the apparatus what is believed to be a novel arrangement of a single hydraulic cylinder motor means adapted to serve selectively the function of opening and closing the jaws for mechanical or vacuum gripping action, and the function of shifting the center of the jaw operating area by moving to one side or the other simultaneously the opposed pair of jaws.

Other objects and advantages will appear from the following description and the drawings wherein:

FIG. 2 is a sectional view of the roll clamp mechanism taken at the line 2—2 in FIG. 1;

FIG. 3 is a more or less schematic diagram of an hydraulic system of the clamp showing a side shifting action or operation;

FIG. 4 is a diagram corresponding to FIG. 3 but showing the system in clamping action;

FIG. 5 is a schematic diagram for a vacuum system for the clamp;

FIG. 6 is an outline drawing illustrating the manner in which the apparatus is adapted to remove a roll from a close packed row of rolls; and FIG. 7 shows in schematic representation a jaw modification with plural pairs of pads.

Figure 1:
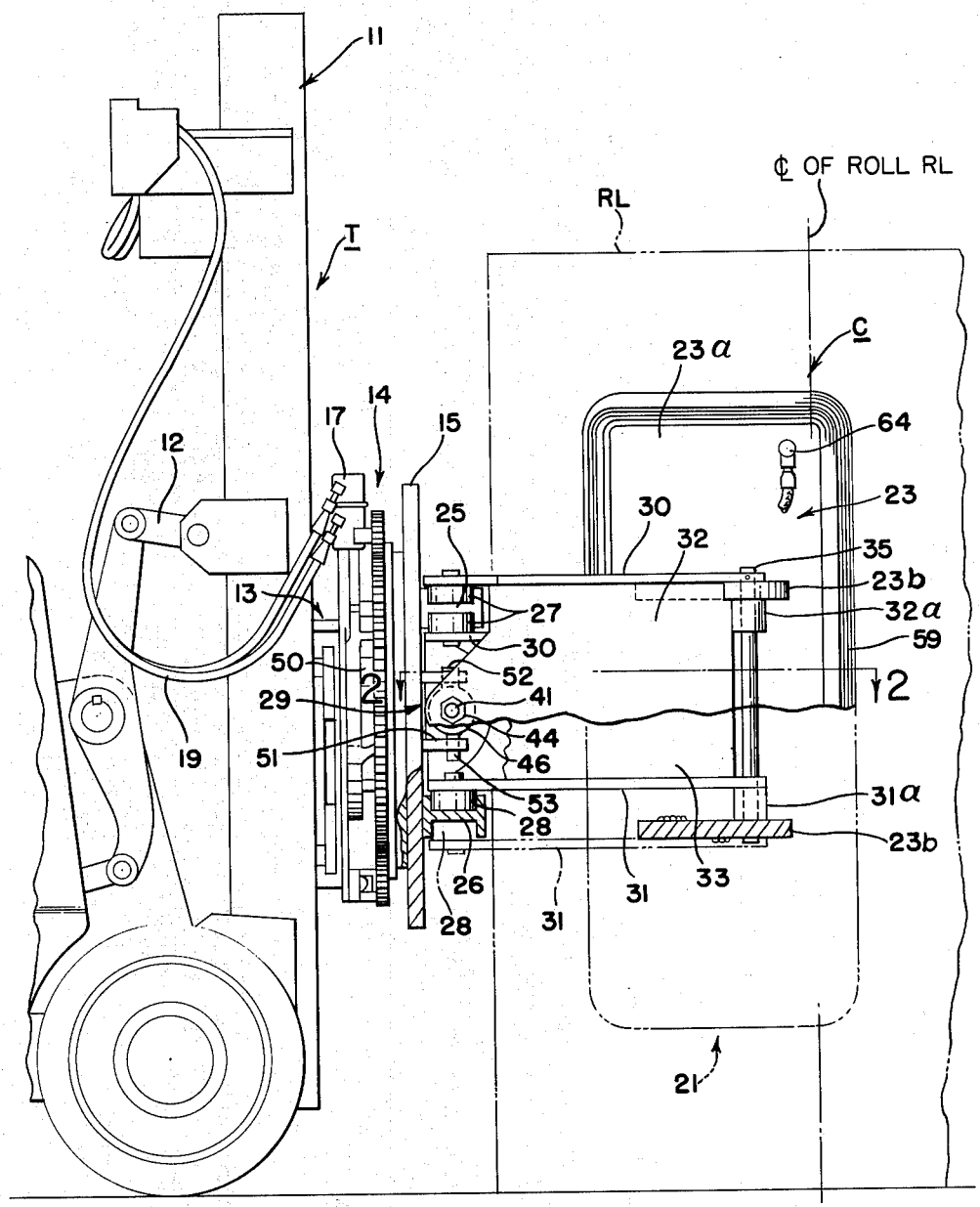
FIG. 1 shows the front end of an industrial truck vehicle incorporating the roll handling apparatus of this invention; the apparatus being partly in section and positioned for engagement of a roll standing on end, or with axis vertical.

A roll handling apparatus according to the present invention is shown in the drawings and hereinafter described as embodied in a tier lift type industrial truck T represented in fragmentary form. A vacuum gripping and clamp device designated by the general reference character C is mounted on the front end of the truck vehicle through conventional tier lift structure including the tier lift elevator frame 11 pivotally mounted near its bottom to the truck chassis for tilting fore and aft by a powered tilting mechanism terminating in the tilting linkage 12; an elevator carriage 13 vertically movable on an extendable part of the frame by usual power mechanism; a rotating mechanism 14 interposed between the clamp base plate 15 and the carriage 13 and actuated by a suitable motor such as a hydraulic motor 17 supplied by hydraulic fluid from a suitable source on the truck vehicle proper through hose means 19. Apart from the clamp mechanism C the elements and structure thus far described individually and as a group may be any of several forms well known to the art, for example, as disclosed in U.S. Patent 2,815,878, to provide means whereby the device C may be mounted on the elevator carriage for rotation about an axis generally perpendicular to the carriage and frame, moved over an extended vertical range, and tilted fore and aft as well as be transported from place to place by typical vehicular motion.

The vacuum gripping and clamp mechanism C (see both FIGS. 1 and 2) includes a pair of opposed slidable jaw structures 21, 22 on each of which is pivotally mounted a vacuum pad 23; each jaw being supported through paired upper rollers 27 and lower rollers 28 mounted on jaw plates 30, 31 respectively received between the flanges of a pair of vertically spaced parallel I-beams 25, 26 secured on the carriage base plate 15, as guideways for reciprocating motion imparted by hydraulic motor means 29.

The jaws, of generally similar construction, are comprised of a pair of vertically spaced roughly L-shaped horizontal plates 30, 31, an interposed vertical end plate 32 generally perpendicular to the carriage base plate, and an inner curved spacer plate 33, all secured together in a rigid form as by welding or the like; the plates 30, 31 in jaw 21 being more widely spaced, to be external to the I-sections, than those in 22 within the sections permitting some degree of telescoping of the jaw inner ends. Accordingly, the rollers are mounted on the inner faces of plates 30, 31 in jaw 21, but in jaw 22 on the outer faces.

Each jaw pad 23 is secured in its respective jaw structure by a pivot shaft or pin 35 passed through parallel brackets 23b welded on the convex back surface of the pad base plate 23a; and, on a jaw, through the outboard ends of the plates 30, 31, and through sleeves 31a, 32a in jaw 22 welded on plates 31, and in jaw 21 welded to plates 32, 33 in the manner indicated above and below the section line in FIG. 1.

The hydraulic motor means 29 comprises a two piston three port hydraulic cylinder unit, double acting as to each piston, with the aligned piston rods 41, 42 projecting from opposite ends of cylinder 46 for connection to the respective jaws 21 and 22 through a ball bushing 43 held on the ends of the piston rod by a nut 44 and movable in seats 45 secured to the inner end of the end plate 32, which is cut away to clear the I-beams.

In a floating center arrangement permitting automatic alignment of the piston rods, the cylinder 46 is secured to the base plate 15 by cylinder pivot studs 52, 53 diametrically disposed thereon and received loosely in two spaced parallel apertured plates 50, 51. The upper stud 52 is suitably bored as a center port to the fluid working space between the opposed pistons and threaded for attachment of a hydraulic hose or connecting line. Near opposite ends of the cylinder unit studs 47, 48 likewise for attachment of hydraulic lines open to the fluid working space on the outer face of the respective pistons.

In the vacuum pads, having substantially identical construction, an elongated transversely curved base plate 23a carries on its periphery, in a formed angle section providing a right angle seat 59 therefor, an open rectangular continuous hollow seal member 60 of square external cross section whereby an initial sealing contact by the pad with a roll to be gripped is made along a closed line. A perforated plate 62 lies within the confines of the seal member 60, fixed in but spaced from the internal concavely curved face of the base plate 23a. A right angle fitting or the like 64 secured to the base plates provides a vacuum port opening to the space between the plate 62 and the base plate 23a, in effect a vacuum manifold space, and therefore to the vacuum working space defined between plate 23a, the seal member 60 and a surface with which the latter is in contact, the plate 62 insuring distribution of vacuum over a large area even upon a compression of the seal 60 which might otherwise permit a roll surface to move inward toward contact with the base plate to diminsh the area of effective vacuum application.

With this type of disposition of the motor unit 29 and the jaws 21, 22 on the base plate 15, both jaw mechanical clamping action or function and also a side shifting or positioning of the effective working center of the jaws is obtained by use of the hydraulic system shown in schematic and generalized from in FIGS. 3 and 4. The principal components of the circuits comprise a suitably motor driven hydraulic pump P drawing fluid from the hydraulic reservoir R and supplying the same under pressure through pressure line 70, including an exhaust or relief valve E to a control valve V, the exhaust valve E releasing fluid to the return line 71, the latter running from the valve V to the reservoir R. For jaw side shifting or positioning, the control valve V completely blocks the line 74 connected to the center port 52 and on one selected position or condition directs fluid supplied under pressure from line 70 through line 75 to the port 48 causing the piston rod 42 and attached jaw 22 to move to the left; and, with the line 74 blocked so that no liquid can escape port 52, thereby moving the piston rod 41 and attached jaw 21 to the left expelling fluid from the port 47 through the line 76 whence it is directed by valve V through exhaust line 71 back to the reservoir as indicated by the solid arrows in FIG. 3. At opposite setting or condition for this type of operation, the reverse action takes place, pressurized fluid being supplied to line 76 to port 47, and fluid being exhausted form port 48 through line 75 to cause motion of the piston rods and attached jaws toward the right simultaneously at the same rate; as indicated by the dashed arrows in FIG. 3.

To cause the jaws simply to move to and fro relative to each other as required merely for the action of opening the jaws to receive a load and closing them for simple mechanical clamping action, the valve V is operable to connect the line 74 to the exhaust line 71 from the valve and simultaneously supply liquid under pressure to opposite ends of the motor through lines 75 and 76 thereby causing the piston rods to move inwardly and jaws to approach each other as indicated by the solid arrows in FIG. 4. For jaw opening action the pressure supply line 70 is connected by the valve to line 74 and thereby port 52 to apply pressure between the pistons and move the piston rods and jaws outwardly, the lines 75 and 76 then being connected through the valve to the exhaust line 71 for exhaust of the fluid from opposite ends of the cylinder, as indicated by the dashed arrows in FIG. 4.

A simple well known vacuum system for the pads may be used, as indicated schematically in FIG. 5 comprised of a vacuum pump VP, e.g., a vane pump, a vacuum line 80 connected to the pump through a check valve 81 and to a vacuum control valve VC which in turn is connected through flexible lines 81 to the respective vacuum pads 23 of the jaws. The control valve VC, appropriately located at the operator's station as a pedal or manual lever controlled valve, is adapted selectively to connect the lines 81, therefore the pads, either to the vacuum line 80 for vacuum application or to an air inlet 82 of the valve for immediate release of the vacuum applied at the pads 23 without venting line 80 and the rest of the system. Also connected to line 80 is a vacuum tank or reservoir VR; and also a vacuum or pressure switch 85 controlling a warning or signal lamp 86 and adapted to turn on the latter when vacuum is lost to a point approaching danger of load release.

With the truck equipped as here shown, vehicle and load clamping mechanism are manipulated or maneuvered in usual manner as well known to the prior art in the manipulations of elevator carriage and therefore clamp height; of clamp and load rotation, of elevator frame tilting as may be required, for example, in picking up a reclining roll with axis horizontal; and of tier lift action in stacking or unstacking rolls, whether stacked on end or reclining with horizontal axes. Both side shifting or positioning of the jaws for a selection of their working region relative to the carriage and jaw clamping action are attained through operation of the hydraulic motor unit 29 as previously explained. Moreover, in addition to mechanical clamping action where a roll load is embraced as fully as possible by the jaws, there is also the further gripping action attainable by application of vacuum to the pads. The latter action in effect increases the size of roll that may be effectively handled by a given set of jaws, inasmuch as that tendency—for the roll to be squeezed out between the jaws which becomes more marked as the areas of clamping contact by the opposed jaws move away from diametric opposition and approach each other—is in some degree overcome by a reverse component of force applied through the vacuum acting normal to the pads.

Moreover, a particular advantage of the combined vacuum and mechanical clamping arrangement appears in removing one of a row or series of closely spaced or tangentially arranged rolls, where it may not only be impossible to approach a diametric engagement of the load by the jaw pads because of the close spacing, but might even be impossible because of roll size sufficiently to engage the roll for any movement at all by any mechanical clamping action.

Such a situation is shown in FIG. 6. With this apparatus, the pads may be brought to bear upon the surface of the roll, the vacuum applied, the roll lifted from the ground slightly and the truck backed out bringing the roll to a point where a fuller engagement by the jaws may be obtained, where the roll is deposited on end and reengaged by the jaws now separated to a wider spacing which is more secure as in FIG. 2 in even the purely mechanical sense. There is then thus obtained a maximum possible roll gripping for most secure transport. A reverse sequence of operations is used in stowing rolls in close packed relation, The jaw modification of FIG. 7 includes more than one vacuum pad on each jaw, here two pads 23A and 23B of different lengths. This is advantageous for handling rolls of markedly different sizes; especially where the vacuum lines and controls are arranged for vacuum application selectively to all pads simultaneously for long rolls, or for smaller rolls to only one pair say 23B which can be brought to lowermost position in a device with a 180° rotatability; or in a device with 360° rotatability, to the other pair of pads 23A as well.

With this modification as well as the arrangement first discussed in detail, as long as the vacuum reservoir has adequate volume relative to the total volume of the pad cavities and the lines between control valve means and pads which is vented to atmospheric pressure upon pad release, the vacuum system including the vacuum reservoir and a pad vacuum control valve means which releases the vacuum grip at the pads by closing off the main vacuum line from the pads and connecting the pads to atmosphere makes available practically instantaneous gripping as well as release upon corresponding control valve actuation.

The disclosed form of relatively reciprocating jaws, with both jaws translatable on the base in the direction in which the jaws open and close, is deemed preferable to use a relatively reciprocatively reciprocating jaw pair wherein one jaw is immovable on the base, or of jaws pivotally mounted on the base, since side shift is also attained by the jaw actuating means. This obviates need of a separate slideway mounting of the clamp base on the elevator carriage and specific motor means therefor, conducing to simplicity, ruggedness and low cost of construction, which are furthered also by use of the disclosed single cylinder hydraulic motor means rather than say two distinct double acting hydraulic cylinder units having two corresponding portions jointly connected through a common line to one of the controlled ports of the valve V.

I claim:
1. An industrial truck having a load carriage vertically movable on a tiltable elevator frame and apparatus for handling cylindrical loads such as paper rolls and the like, said apparatus comprising:
   a base plate rotatable on the carriage about a normally horizontal axis,
   a pair of opposed jaws each translatably mounted on the base for movement toward and away from each other,
   hydraulic cylinder motor means supported on the base and providing a pair of double acting pistons with aligned piston rods connected to respective jaws for translating the jaws on the base,
   vacuum pad means pivotally mounted on outboard ends of respective said jaws, and adapted to engage at circumferentially spaced locations the cylindrical surface of a load selectively variable from proximate pad locations on a portion of the surface lying between a diameter of the load and said base to substantially diametric locations, and to be moved with said jaws toward and away from each other,
   means including a vacuum pump for applying a vacuum to said pad means simultaneously to provide a vacuum load engagement,
   and control means whereby a cylindrical load may be engaged selectively by mechanical action alone of said jaws operated by said hydraulic cylinder means when said pads are in approximately diametric engagement with a cylindrical load, by load gripping vacuum action alone applied to said pads, or by both actions.

2. Apparatus as described in claim 1, wherein:
   said vacuum pad means includes a plurality of pairs of opposed like pads,
   whereby loads of markedly different lengths may be manipulated by selectively using all or less than all pairs engaging the load with vacuum application only on the engaged pairs.

3. Apparatus as described in claim 1, wherein:
   said vacuum pad means includes a plurality of pairs of opposed like pads,
   said pads in direction intended to be parallel to the axis of an engaged load having a different dimension in one pair from that in another,
   whereby loads of markedly different lengths may be manipulated by selectively using all or less than all pairs engaging the load with vacuum application only on the engaged pairs.

4. An industrial truck having a load carriage vertically movable on a tiltable elevator frame, and apparatus for manipulating cylindrical loads; said apparatus comprising:
   base rotatable on the carriage about a normally horizontal axis,
   a pair of opposed vacuum pads adapted to engage a cylindrical surface of the load at circumferentially spaced locations, selectively variable from proximate pad locations on a portion of the surface lying between a diameter of the load and said base to substantially diametric locations,
   means having the pads supported thereon pivotally about parallel axes and mounting said pads on the base for movement of at least one pad relative to the base and toward and away from the other,
   motor means operating upon the first said means for moving the pads relatively towards and away from each other and adapted to apply a mechanical load gripping force to a cylindrical load through said pads when said pads are in approximately diametric engagement with a cylindrical load,
   and vacuum system means including a vacuum pump and adapted to develop a load gripping vacuum at both said pads simultaneously, said system including control valve means for application of vacuum at the pads.

5. Apparatus in combination with an industrial truck as described in claim 4,
including a plurality of pairs of opposed like pads, whereby loads of markedly different lengths may be manipulated by selectively using all or less than all pairs engaging the load with vacuum application only on the engaged pairs.

6. Apparatus in combination with an industrial truck as described in claim 5, including means in said control valve means for selectively applying vacuum to the pad pairs.

7. In an industrial truck as described in claim 4, each said pad comprising
a base plate pivoted on a respective said jaw,
a continuous load engaging resilient seal member extending about the periphery of the jaw and secured to the jaw in substantially air-tight relation defining therewith a vacuum load gripping area of the pad,
said seal member having a continuous load-engaging portion elevated above the surface of the base plate on its load working face,
substantially rigid means mounted on and in spaced relation to the base plate and to said load-engaging portion of the seal member within the defined area and extending over the major part of said area to define in turn with said base plate a vacuum manifold space,
said rigid means having a multitude of substantially uniformly distributed air passage therethrough,
and means for connecting said manifold space to external vacuum producing means.

8. An industrial truck having a load carriage vertically movable on a tiltable elevator frame and apparatus for handling cylindrical loads such as paper rolls and the like, said apparatus comprising:
a base rotatable on the carriage about a normally horizontal axis,
a pair of opposed jaws each translatably mounted on the base for movement toward and away from each other,
hydraulic clyinder motor means supported on the base and providing a pair of double acting pistons with aligned piston rods connected to respective jaws for translating the jaws on the base,
vacuum pad means pivotally mounted on outboard ends of respective said jaws and adapted to engage at circumferentially spaced locations the cylindrical surface of a load and to be moved with said jaws toward and away from each other,
means for applying a vacuum to said pad means simultaneously to provide a vacuum load engagement,
and control means whereby a cylindrical load may be engaged selectively by mechanical action alone of said jaws operated by said hydraulic cylinder means, by load gripping vacuum action alone applied to said pads, or by both actions,
said hydraulic cylinder motor means including a common cylinder for said pistons,
floating center means pivotally mounting said cylinder to the base,
and means connecting said rods to respective jaws with a limited degree of universal motion.

References Cited by the Examiner

UNITED STATES PATENTS

| | | | |
|---|---|---|---|
| 254,741 | 3/1882 | Walsh | 254—93 |
| 875,021 | 12/1907 | Westbrook. | |
| 1,294,103 | 2/1919 | Hitchcock | 294—64 |
| 1,792,576 | 2/1931 | Dryon. | |
| 1,996,385 | 4/1935 | Owen | 294—65 |
| 2,131,869 | 10/1938 | Burrell | 294—65 |
| 2,218,936 | 10/1940 | Melown. | |
| 2,393,503 | 1/1946 | Bosomworth | 18—17 |
| 2,511,265 | 6/1950 | Hoopingarner. | |
| 2,578,220 | 12/1951 | Billner | 294—65 |
| 2,776,163 | 1/1958 | Cremer | 294—64 |
| 2,821,316 | 1/1958 | Saint | 214—653 |
| 2,870,929 | 1/1959 | Quayle | 214—652 |
| 2,893,581 | 7/1959 | Cushman | 294—64 |
| 2,899,088 | 8/1959 | Corbin. | |
| 2,904,202 | 9/1959 | Brady | 214—653 |
| 2,915,332 | 12/1959 | Coteswirth et al. | 214—652 |
| 2,929,523 | 3/1960 | Cushman | 214—651 |
| 2,942,745 | 6/1960 | Horton | 214—650 |
| 2,984,985 | 5/1961 | MacMillin. | |
| 3,008,747 | 11/1961 | Lytle | 294—64 |

FOREIGN PATENTS 1,012,259    7/1957    Germany.

GERALD M. FORLENZA, *Primary Examiner.*

MORRIS TEMIN, HUGO O. SCHULZ, *Examiners.*